3,328,221
METHOD FOR MAKING LAMINATED MATERIALS
Joseph Pufahl, 81 Gerard Ave., New Hyde Park, N.Y. 11040
Filed Mar. 22, 1962, Ser. No. 181,527
7 Claims. (Cl. 156—209)

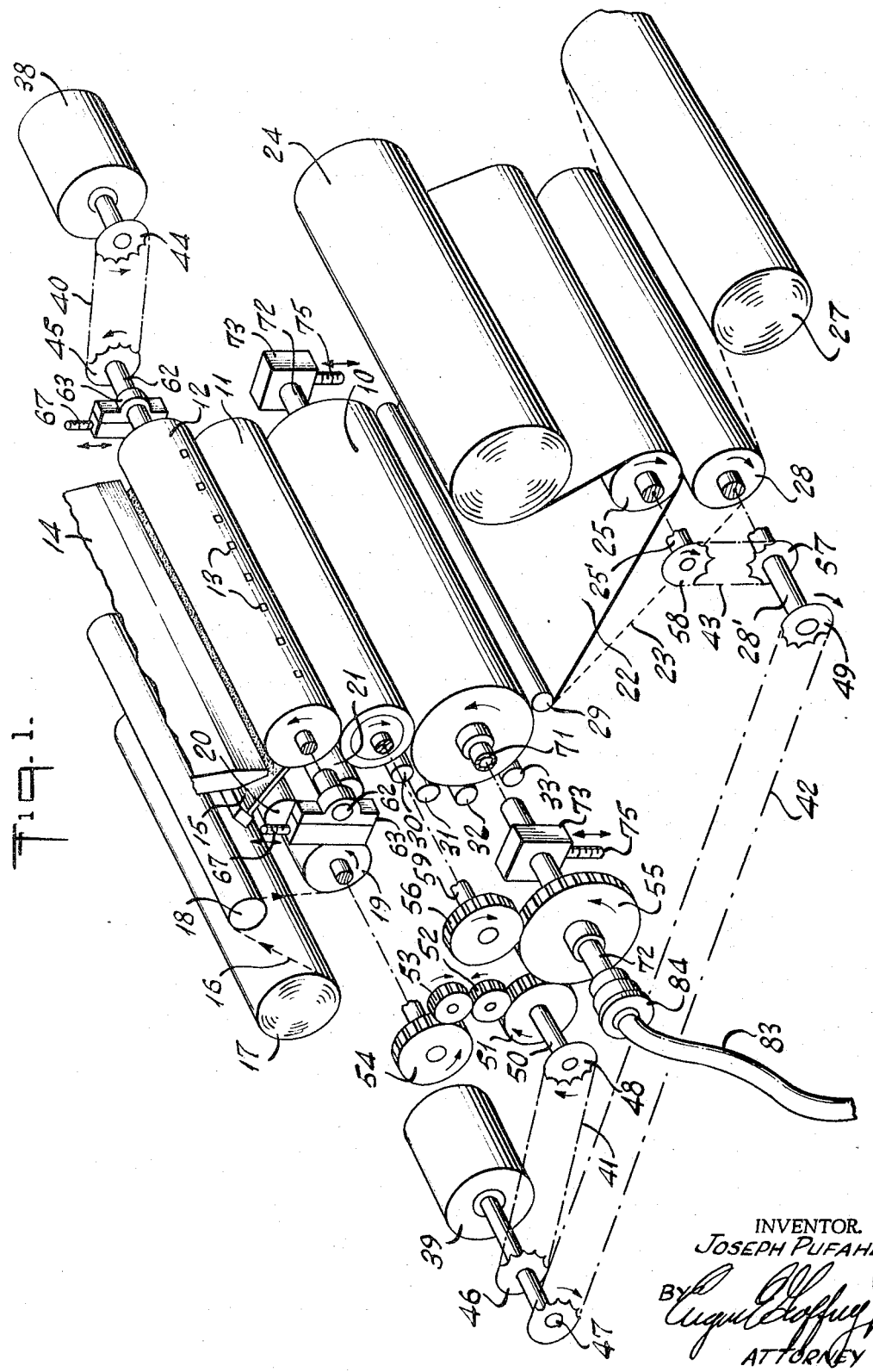

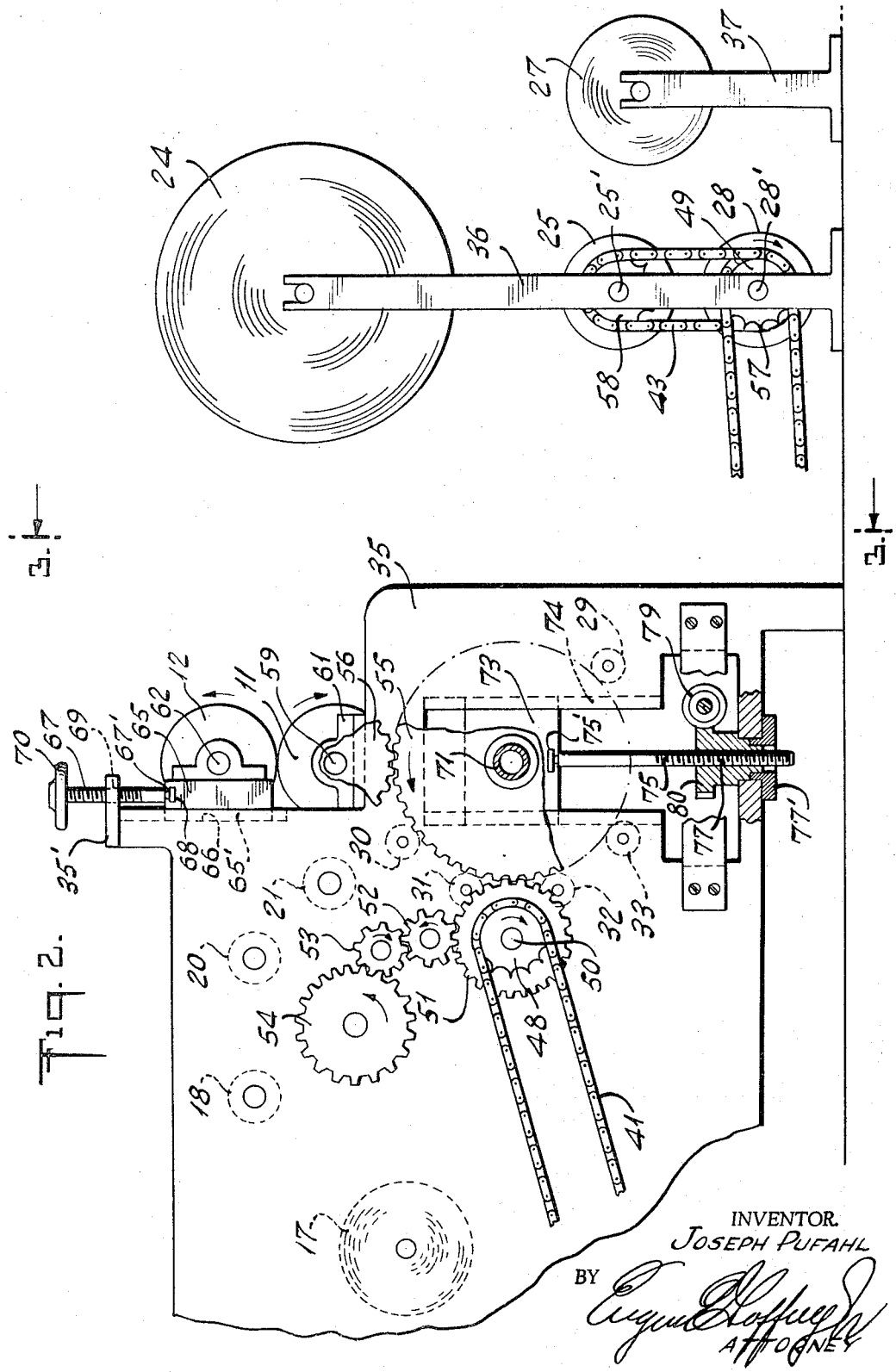

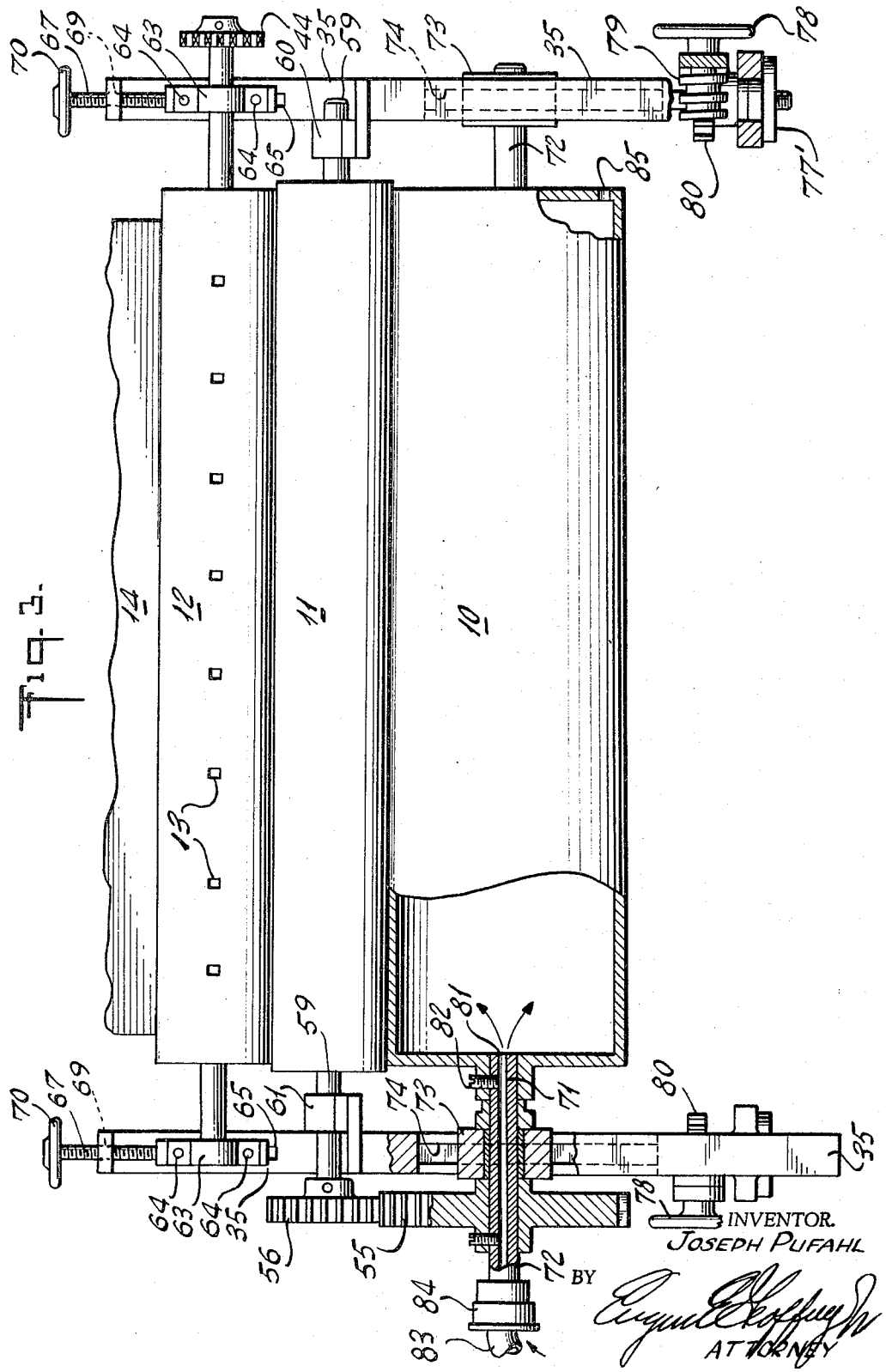

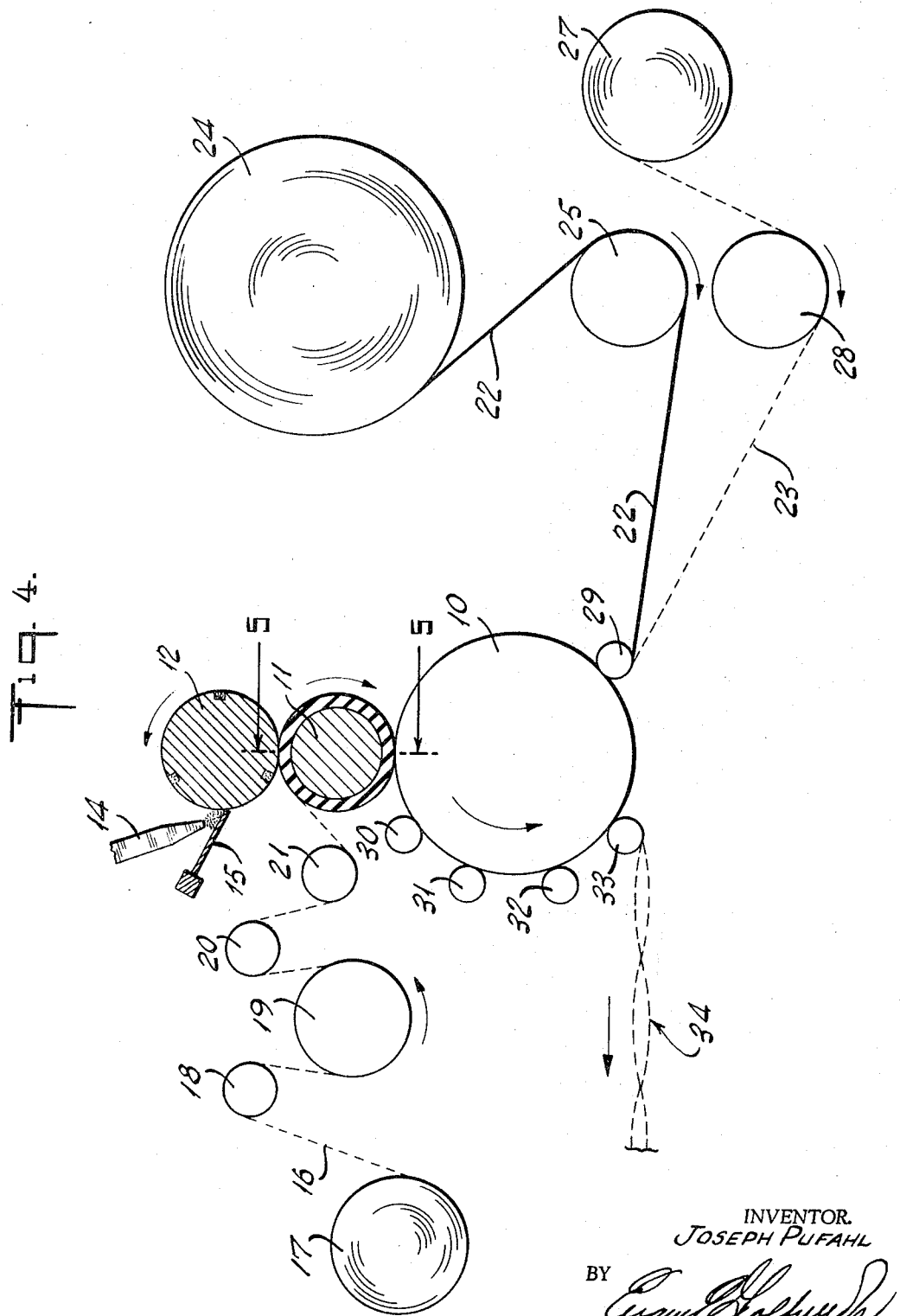

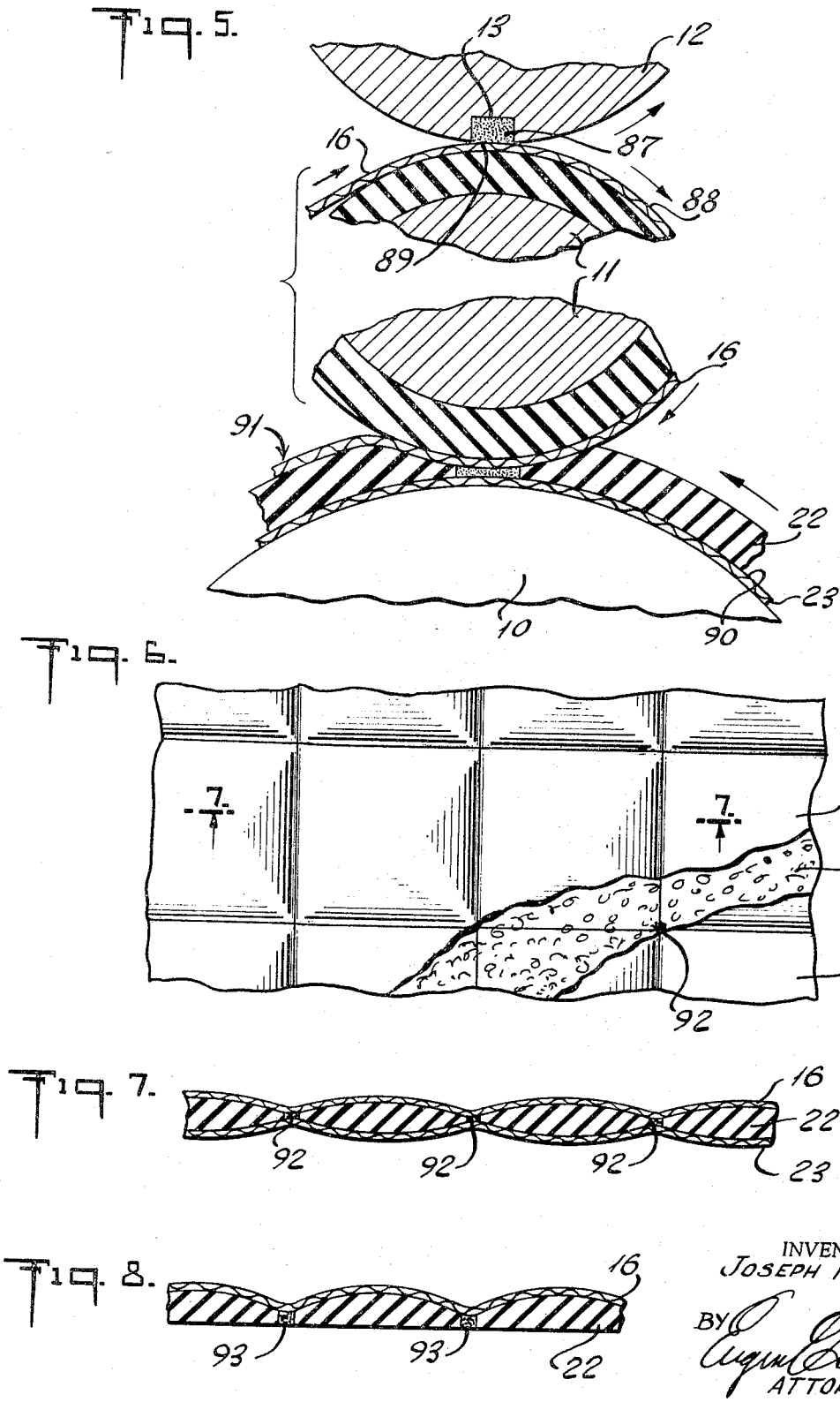

This invention relates to laminated materials and their manufacture. The invention more specifically concerns a new and improved method and apparatus for the production of multi-ply materials of fabrics, plastics and the like which are useful, among other things, for garments and other articles designed for protective, insulating, decorative and other purposes.

Lamination of fabrics with filler materials is most generally accomplished by the use of machine sewn seams, such as in the case of quilts and quilted materials, or by means of other involved methods of manufacture which are costly and time consuming. While efforts have been made to simplify said processes, no effective solution has been encountered without materially altering the characteristics of the end product.

This invention has as one of its objectives the provision of an improved method and apparatus which facilitate the manufacture of laminated fabrics, overcoming the disadvantages of known procedures and providing an improved product at reduced cost. This end is obtained through a new method of laminating materials wherein a plurality of fabrics and a suitable filler are processed simultaneously into a finished product in one continuous operation.

Another aspect of this invention resides in the provision of an improved method and apparatus for the manufacture of laminated materials wherein a plurality of fabrics and single or composite filler or core of a porous and resilient nature are permanently affixed into a laminate by printing or otherwise applying a suitable adhesive onto one or several of the laminate in any desired form, shape or pattern. Through the use of an improved arrangement and coordination of elements, the adhesive is forced through the associated or intervening layer producing a secure and permanent bond.

Another object of this invention resides in the provision of a novel and improved method and apparatus for laminating fabrics wherein the adhesive is applied in a desired pattern to at least one of the inner fabric surfaces and caused to penetrate the inner fabrics in such a manner that the finished product affords a contoured appearance corresponding to the pattern in which the adhesive was applied.

A still further object resides in the provision of a new and improved adhesive for laminating fabrics wherein penetration of the fabrics can be controlled and at the same time the adhesive can be set rapidly to produce interesting and ornamental contoured effects on fabrics.

The improved laminated fabric in accordance with the invention affords a contoured surface with undesirable traces of seams, adhesives or other means used to fasten laminae one to the other. Furthermore, the pattern or design of the bonded areas can be varied in size, distribution, or shape to suit most any practical or decorative purpose for which the product may be intended, and when the fabric embodies a cellular cushioning core such as found in quilts and quilted materials, it possesses excellent insulating properties throughout the entire area.

The above and other objects and advantages of the invention will become more apparent from the following description and accompanying drawings forming part of this application.

In the drawings:
FIG. 1 is a perspective partially diagrammatic view of one embodiment of the invention with portions of the driving mechanism off-set for purposes of clarity.
FIG. 2 is a side elevation of the embodiment shown in FIG. 1 with portions broken away.
FIG. 3 is a cross-sectional view of FIG. 2 taken from the line 3—3 thereof with sections cut away.
FIG. 4 is a diagrammatic view of the embodiment of the apparatus shown in FIG. 1 illustrating the bonding of three laminae into a finished product.
FIG. 5 is an enlarged cross-sectional view taken along the line 5—5 of FIG. 4.
FIG. 6 is a plan view of a resulting laminate in accordance with the invention.
FIG. 7 is a cross-sectional view of FIG. 6 taken at the line 7—7 thereof.
FIG. 8 is a cross-sectional view of a modified two-ply fabric in accordance with the invention.

Broadly, the process in accordance with the invention contemplates in one aspect the bonding of a plurality of layers of fabric and one or more intervening layers of a porous, resilient material by means of an adhesive into a resultant unitary laminate, and in another aspect, the manufacture of a laminated material that affords a high degree of cushioning and insulation, that in the process of bonding provides the possibility for an unlimited variety of relief patterns of practical and decorative value which can be produced on one or both sides of the finished product. It has been found, for instance, that a pair of outer fabric layers and an intervening layer of a porous insulating material such as polyurethane or similar product may be processed simultaneously and in continuous sheet form to produce the completed laminate. This is attained by an improved method and apparatus wherein the adhesive is printed or otherwise applied either to the inner surface of one or both of the outer fabrics of the laminate, or to the intervening core. It is preferable to apply the adhesive in a suitable intermittent or ornamental pattern, whereupon said plurality of overlying layers are then permanently bonded by the application of heat and pressure.

More specifically, the several layers to be bonded one to the others are fed in overlying relationship through a pair of pressure rollers, one of which preferably has a resilient surface while the other roller has a relatively hard surface. When subjected to pressure, the adhesive is forced into contact with all laminae. The adhesive sets rapidly and the portions of the laminate containing the adhesive will be compressed and remain in that compressed condition. In this way any desired relief pattern such as found in quilts and similar materials can be obtained on both surfaces of the finished product.

Referring now to the drawings and specifically to FIGS. 1 and 4, both of which illustrate a suggested arrangement of the apparatus for this invention.

The central portion of this apparatus includes three rollers arranged in parallel relationship, namely a steam heated roller 10 preferably coated with a tetrafluoroethylene or other suitable plastic, a resilient roller 11, and an etched roller 12 bearing on its surface impressions 13 in the form of a selected design or configuration for reception of adhesive from the supply trough 14. The excess adhesive is removed by the doctor blade 15. The adhesive retained in the depressions 13 in the etched roller is transferred onto one outer fabric 16, of the laminate to be manufactured, as the fabric passes between the printing roller 12 and the resilient roller 11. The fabric layer 16 is supplied from feeder spool 17 and passes over the tension adjustment roller 18, the power roller 19 and tension adjustment rollers 20 and 21 to the resilient roller 11 and the printing roller 12. Since the adhesive adheres more readily to the fabric than to the roller 12, it is transferred upon contact to the fabric. The fabric 16 is then brought into overlying relationship with the remaining laminae 22 and 23, at the point of contact of rollers 10 and 11. The intervening layer 22 is supplied from feeder spool 24, passes over the power roller 25 and is brought into overlying relationship with the fabric 23 which is simultaneously supplied by feeder spool 27 and similarly passes over a power roller 28 to the tension roller 29 from where both laminae 22 and 23 are conveyed over the steam heated roller 10 to the point of contact between rollers 10 and 11, where all three laminae are compressed. In this process the adhesive on the printed fabric is forced through the intervening layer and adheres to the opposing fabric creating a permanent bond. The laminate continues to be conveyed along the surface of steam roller 10 and is successively compressed by pressure rollers 30, 31, 32 and 33 while the adhesive dries. The laminated material 34 is then conveyed to a suitable receiving spool not shown.

The whole assembly of rollers is carried by a frame having a pair of side members 35, while the spools 24 and 27 are carried by separate supporting structures 36 and 37, as indicated in FIG. 2. The axles of the power driven rollers extend beyond the housing and spur gears with matching teeth are mounted on them, transferring the power from one to the next. Mechanical driving power is supplied to the apparatus by two electric variable speed motors 38 and 39 which are synchronized to coordinate the rotation of printing roller 12 with its cooperating roller 11. In this way the printing roller 12 may be of any diameter required to produce the desired design. The motor 38 drives the printing roller 12 by means of a sprocket 44, chain 40, sprocket 45, the latter being secured to the axle of the printing roller 12. Motor 39 provides the primary driving power and carries a pair of sprockets 46 and 47 fixed to the motor shaft. The motor sprocket 46 is coupled by a chain 41 to the sprocket 48 carried by shaft 50 for driving the power gear 51. A second chain 42 couples the motor sprocket 47 to a sprocket 49 on shaft 28′ forming part of roller 28.

The primary power gear 51 transmits power through a pair of idler gears 52 and 53 to the spur gear 54 for driving the roller 18. Spur gear 51 also meshes with spur gear 55 affixed to the axle of steam heated roller 10, and the gear 55 in turn meshes with spur gear 56 to drive the resilient roller 11. The feed roller 25 for supplying the core material 22 is driven by a chain 43 coupling sprocket 57 on the roller shaft 28′ and sprocket 58 on the 25′ of roller 25.

Reference is now made to FIGS. 2 and 3 and specifically to the devices for adjusting the pressure of the printing roller 12 and of the steam heated roller 10 upon the resilient roller 11. In the instant embodiment of the invention, the resilient roller has an axle 59 carried in fixed journals 60 and 61 secured to the frame members 35. The printing roller 12 is provided with two pressure adjustment devices, one mounted on each side of the frame 35 and rotatably carrying the axle 62. Each pressure adjusting device includes one movable journal 63, bolted at 64 to a carrier 65 having a dovetailed portion 65′ slidably engaging a cooperating guideway 66 restricting the assembly to a vertical movement. These pressure adjustment assemblies are each controlled by a threaded bolt or lead screw 67, having on one end a shoulder 67′, which engages an undercut slot 68 in the carrier 65. The lead screw engages a threaded opening 69 in the frame member 35′ and is operated by a hand wheel 70 at the head of the bolt. Thus the printing roller 12 may be adjusted vertically by rotation of the hand wheel 70. The pressure of steam heated roller 10 upon the resilient roller 11 is similarly controlled by two adjusting devices, mounted in the frame members 35. The ends 71 and 72 respectively of the heated roller axle are carried by journals 73. Each journal 73 is slidably carried in guideways 74 on each side of the journal. The journals are adjustably positioned by a lead screw 75 threadably engaging a collar 77 having a worm gear 80 formed as an integral part thereof. The worm gear is journaled to the frame 35, the latter carrying a thrust bearing 77′. A worm 79 meshes with the gear 80 and is rotated by hand wheel 78. The upper end 75′ of the lead screw 75 is fixed in the journal block 73 so that rotation of the hand wheel will vertically adjust the roller 10 to attain the desired pressure.

In order to permit an uncluttered insight into the main embodiments of this apparatus, the member carrying rollers 29, 30, 31, 32 and 33 is not shown in the drawings. Nevertheless, on the actual apparatus said rollers, bearing against the surface of the heated roller 10, are journaled in a plate extending from journal 73, permitting tension adjustment of roller 10 against roller 11 without essentially altering the relative relationship of rollers 29, 30, 31, 32 and 33 to roller 10.

FIG. 3 shows one embodiment of a steam heated roller 10. The roller 10 is preferably in the form of a hollow drum provided with a passage 81 for the entry of steam. This passage extends through the shaft or axle 71 of roller 10 and is connected to a steam source 83 by means of a rotary union 84. The drum or roller 10 is secured to the tubular axle 71 by a set screw 82 or other suitable means and steam condensate is discharged through orifices 85.

FIG. 5 serves to illustrate in detail the process of lamination. In the drawing, one fabric 16 is conveyed from its supply spool 17 onto the resilient roller 11 preferably coated with rubber or other suitable material on which it travels to the point of contact with the printing roller 12. The printing roller deposits the adhesive 87 from the depression 13 onto the surface 88 of the fabric 86 covering an area 89. The fabric then travels along the curved surface of roller 11 until it makes contact with the intervening layer 22 and the opposing fabric 23, which are supplied simultaneously from separate sources 24 and 27 onto the steamroller 10. All three laminae, 16, 22, and 23, then are compressed in an overlying relationship to each other while passing between rollers 10 and 11, where the adhesive is forced through the intervening layer onto surface 90 of fabric 23 creating a bond among all three laminae. The resultant laminate 91 is compressed successively by pressure rollers 30, 31, 32 and 33 of FIGS. 1 and 4 while the adhesive sets on the heated drum 10, and is then conveyed to a suitable receiving spool not shown.

The invention as described above is particularly applicable for the fabrication of so-called three-ply material consisting of two outer layers and a central core which may be formed of one or more layers of a resilent porous material. It was also pointed out that the adhesive applied to the inner surface of one outer layer was forced through the core to contact and adhere to the inner surface of the other outer layer. It is quite evident that the same procedure may be utilized in the fabrication of a composite material utilizing one outer fabric as for instance the fabric 16 and a core material such as the core 22. With this arrangement a somewhat smaller amount of adhesive would normally be employed in order to prevent the adhesive from completely penetrating the porous resilient core.

While any suitable adhesive may be employed, one adhesive that has been found particularly useful comprises a composition containing an acrylic emulsion, heterocyclic melamine, silica and emulsion thickener, ammonium chloride and ammonium hydroxide. One specific composition that has been found particularly effective includes approximately 75 to 90 parts of acrylic emulsion, 15 to 25 parts of heterocyclic melamine, approximately 5 to 15 parts of disbursed silica, approximately 3 to 8 parts of an emulsion thickener and one part each of ammonium chloride and ammonium hydroxide. This composition is quite tacky and waterproof and the silica will prevent bleeding of the adhesive through the outer fabrics. The ammonium chloride aids in setting the resin while the ammonium hydroxide thickens the adhesive and also stabilizes the pH. When the resin is heated, ammonia is liberated and the resultant small amount of hydrochloric acid polymerizes the melamine.

The resultant fabric in accordance with the invention is illustrated in FIGS. 6, 7 and 8. In the illustrated fabric dots of adhesive are printed on the inner surface of the fabric layer 16 and the resultant structure provides a somewhat rectangular contour or tufted fabric as shown in FIG. 6. In FIG. 7 it will be observed that the adhesive at the points 92 penetrates the core 22 but does not penetrate the outer fabrics 16 and 23.

FIG. 8 shows a two-ply fabric embodying layers 16 and 22 and it will be observed that the adhesive at the points 93 only partially penetrates the core 22.

While the adhesive is shown in the instant embodiment of the invention as being applied in the form of dots at spaced intervals it is quite evident that any suitable configuration of adhesive may be applied in the manner illustrated and described. For instance, it may be applied in geometrical configurations or in the form of artistic decorations such as flowers and the like with the result that such configurations will be apparent in contour or relief on the surfaces of the fabric.

Actual practice with the invention has indicated that the fabric can be manufactured at exceedingly high speeds and with the utilization of a minimum amount of adhesive. Any desired fabrications may be employed to produce the desired end product, though it has been found that polyurethane as a filler produces an ideal structure particularly when good insulating characteristics are required as in the case of blankets, clothing or the like.

While only certain embodiments have been illustrated and described, it is apparent that modifications, alterations and changes may be made without departing from the true scope and spirit as defined in the appended claims.

What is claimed is:

1. The method for making a laminated material having at least one porous resilient layer and at least one outer layer comprising the steps of printing an adhesive on selected areas of a surface of at least one of said layers, moving said layers into overlying relationship with said adhesive disposed therebetween, then compressing said overlying layers to bond said layers one to the other and cause said adhesive to at least partially penetrate said porous layer and hold the penetrated portions of the porous layer in a compressed condition and thereby producing a contoured surface on the overlying layer.

2. The method for making laminated material according to claim 1, wherein heat is applied to the laminate to accelerate the drying process while the layers are compressed.

3. The method for making laminated material in accordance with claim 1, wherein the adhesive is printed intermittently onto at least one surface of at least one layer in a predetermined pattern.

4. The method for making laminated material according to claim 1, wherein the adhesive is printed on the inner surface of one of said layers, feeding a second outer layer into overlying relationship with said porous layer and then compressing said layers to force the adhesive through said porous layer and into contact with said second outer layer to bond the layers together.

5. The method of laminating materials as defined in claim 1, wherein the adhesive is applied onto the inner surface of the first said outer layer.

6. The method for making laminated materials according to claim 5, including the step of applying heat to the laminate during compression to accelerate the drying process of the adhesive.

7. The method for making laminated materials according to claim 5, wherein the adhesive is printed in predetermined intermittent configurations onto at least one surface of at least one layer.

References Cited

UNITED STATES PATENTS

| | | | |
|---|---|---|---|
| 1,999,283 | 4/1935 | Clemens | 156—291 |
| 2,178,566 | 11/1939 | Dike et al. | 156—291 |
| 2,382,929 | 8/1945 | Williams | 118—212 |
| 2,923,653 | 2/1960 | Matlin et al. | 154—46 |
| 2,931,749 | 4/1960 | Matlin et al. | 154—46 |
| 3,036,927 | 5/1962 | Jerothe | 117—7 |
| 3,070,476 | 12/1962 | Miller | 156—291 XR |
| 3,161,560 | 12/1964 | Paquin et al. | 161—250 |

FOREIGN PATENTS 812,820   4/1959   Great Britain.

EARL M. BERGERT, *Primary Examiner.*

L. T. PIRKEY, H. F. EPSTEIN, *Assistant Examiners.*